United States Patent
Jang

(10) Patent No.: US 10,475,571 B2
(45) Date of Patent: Nov. 12, 2019

(54) WIRELESS POWER RECEPTION MODULE

(71) Applicant: Amosense Co., Ltd., Cheonan-si (KR)

(72) Inventor: Kil Jae Jang, Seongnam-si (KR)

(73) Assignee: Amosense Co., Ltd., Cheonan-si (KR)

( * ) Notice: Subject to any disclaimer, the term of this patent is extended or adjusted under 35 U.S.C. 154(b) by 29 days.

(21) Appl. No.: 15/575,566

(22) PCT Filed: May 24, 2016

(86) PCT No.: PCT/KR2016/005483
§ 371 (c)(1),
(2) Date: Nov. 20, 2017

(87) PCT Pub. No.: WO2016/190649
PCT Pub. Date: Dec. 1, 2016

(65) Prior Publication Data
US 2018/0137971 A1    May 17, 2018

(30) Foreign Application Priority Data

May 26, 2015   (KR) .................. 10-2015-0073170

(51) Int. Cl.
*H01F 38/14*    (2006.01)
*H02J 17/00*    (2006.01)
(Continued)

(52) U.S. Cl.
CPC ....... *H01F 27/365* (2013.01); *H01F 27/2804* (2013.01); *H01F 38/14* (2013.01);
(Continued)

(58) Field of Classification Search
CPC .. H01F 38/14; H01F 7/0247; H01F 2003/106; H01F 27/365; H01F 27/2804;
(Continued)

(56) References Cited

U.S. PATENT DOCUMENTS

2007/0222426 A1*  9/2007  Waffenschmidt ....... H01F 38/14
                                                          323/355
2007/0228833 A1* 10/2007  Stevens ................... H02J 5/005
                                                          307/45
(Continued)

FOREIGN PATENT DOCUMENTS

CN      103109591 A    5/2013
CN      104011814 A    8/2014
(Continued)

OTHER PUBLICATIONS

International Search Report dated Sep. 9, 2016; for Korean PCT/KR2016/005493; 2 pages.

*Primary Examiner* — Alfonso Perez Borroto
*Assistant Examiner* — Esayas G Yeshaw
(74) *Attorney, Agent, or Firm* — Daly, Crowley, Mofford & Durkee, LLP

(57) ABSTRACT

The wireless power receiving module is disclosed. According to one embodiment of the present invention, the wireless power receiving module, to interact with a wireless power transmitting module including at least one wireless power transmitting antenna and a permanent magnet, includes an antenna unit including the wireless power receiving antenna formed of a hollow portion having a predetermined area at a central portion of a pattern portion and a shielding unit disposed on one surface of the antenna unit so as to shield a magnetic field. The shortest length between the inner sides of a coil pattern portion facing each other is the same as or larger than a diameter of the permanent magnet.

15 Claims, 10 Drawing Sheets

(51) Int. Cl.
  *H01F 27/36* (2006.01)
  *H01Q 5/30* (2015.01)
  *H02J 50/10* (2016.01)
  *H01F 27/28* (2006.01)
  *H01Q 7/06* (2006.01)
  *H02J 50/27* (2016.01)
  *H01Q 1/22* (2006.01)
  *H01Q 1/24* (2006.01)
  *H01Q 1/38* (2006.01)

(52) U.S. Cl.
  CPC ............... *H01Q 5/30* (2015.01); *H01Q 7/06* (2013.01); *H02J 50/10* (2016.02); *H01Q 1/2208* (2013.01); *H01Q 1/243* (2013.01); *H01Q 1/38* (2013.01); *H02J 50/27* (2016.02)

(58) Field of Classification Search
  CPC ............ H02J 7/025; H02J 50/27; H02J 50/10; H01Q 1/38; H01Q 1/243; H01Q 1/2208; H01Q 7/06; H01Q 5/30
  See application file for complete search history.

(56) References Cited

U.S. PATENT DOCUMENTS

| | | | |
|---|---|---|---|
| 2011/0127951 A1* | 6/2011 | Walley | H02J 7/025 320/108 |
| 2011/0164471 A1* | 7/2011 | Baarman | H02J 7/025 368/10 |
| 2012/0032632 A1* | 2/2012 | Soar | H01F 38/14 320/108 |
| 2014/0143933 A1* | 5/2014 | Low | G04C 10/00 2/170 |
| 2015/0311724 A1* | 10/2015 | Callanan | H02J 7/025 307/104 |
| 2015/0318710 A1* | 11/2015 | Lee | H02J 5/005 307/104 |
| 2015/0325362 A1 | 11/2015 | Kumura et al. | |
| 2015/0326028 A1* | 11/2015 | Suzuki | H02J 7/025 307/104 |
| 2016/0064814 A1 | 3/2016 | Jang et al. | |
| 2017/0047787 A1* | 2/2017 | Akuzawa | H01F 38/18 |
| 2018/0062430 A1* | 3/2018 | Matsumoto | H02J 7/00 |

FOREIGN PATENT DOCUMENTS

| | | |
|---|---|---|
| JP | 2012-156483 A | 8/2012 |
| JP | 2014-110594 A | 6/2014 |
| JP | 2014187724 A | 10/2014 |
| KR | 10-2014-0109336 A | 9/2014 |
| KR | 10-2014-0130837 A | 11/2014 |

* cited by examiner

120'

120'

WIRELESS POWER RECEPTION MODULE

CROSS-REFERENCE TO RELATED APPLICATION

This application is a U.S. National Stage of PCT/KR2016/005483 filed in the Korean language on May 24, 2016, entitled: "Wireless Power Reception Module" which application claims priority to Korean Application No. 10-2015-0073170 filed on May 26, 2015, which applications are each hereby incorporated herein by reference in their entireties.

BACKGROUND

1. Technical Field

The present invention relates to a wireless power receiving module, and more particularly, in constructing a wireless power transmitting module to include a permanent magnet, to the wireless power receiving module for minimizing the influence of the permanent magnet.

2. Discussion of the Related Art

Recently, a portable terminal has a wireless charging function for wirelessly charging a built-in battery. The wireless charging can be performed by a wireless power receiving module built in the portable terminal, and a wireless power transmitting module for supplying power to the wireless power receiving module.

The manner of the wireless charging may be classified into a magnetic induction type and a magnetic resonance type, or may be classified into a Power Matters Alliance (PMA) standard and a Qi standard depending on a method of detecting approach of the wireless power receiving module toward the wireless power transmitting module.

According to the PMA wireless charging standard, operations of the wireless power transmitting module may be controlled by detecting the approach of the wireless power receiving module using a permanent magnet and a Hall sensor provided in the wireless power transmitting module.

As shown in FIG. 1, the wireless power transmitting module 10 is configured that the wireless power transmitting antenna 16 for transmitting the wireless power is disposed on a side of a shielding sheet 11, and a permanent magnet 14 is disposed at a central portion of the wireless power transmitting antenna 16.

When a wireless power receiving module 20 approaches the wireless power transmitting module 10, a part of magnetic force lines of a magnetic field generated from the permanent magnet 14 may be attracted by an attractor 22 provided in the wireless power receiving module 20, which causes variation of the magnetic field in a Hall sensor 12 and thus an output voltage of the Hall sensor 12 varies accordingly.

In recent years, a thickness of the wireless power receiving module 20 incorporated in a portable terminal become thinner as the portable terminal become thinner and smaller. For example, it is required that the thickness of the wireless power receiving module 20 should be designed to be 0.3 mm or less. In designing the thickness of the wireless power receiving module to be 0.3 mm or less, the thickness of a shielding sheet should be thinner but the wireless power receiving antenna should smoothly operate.

In order to satisfy such a design requirement, there is a method of reducing the thickness of the shielding sheet, or reducing the thickness of the wireless power receiving antenna. The wireless power receiving antenna has a required thickness for its minimum normal operation, so there is a limitation to reducing its thickness. Accordingly, it is necessary to satisfy the design requirements by reducing the thickness of the shielding sheet.

As an effort for this, it was tried that the shielding sheet was configured to have a thickness of about 160 μm to realize a total thickness of the wireless power receiving module of 0.3 mm. However, when the thickness of the shielding sheet was designed to be thin as described above, there was a problem that the wireless power receiving antenna was not effectively operated due to an influence of a time-invariant magnetic field generated by the permanent magnet.

It is because that an intensity of the time-invariant magnetic field generated by the permanent magnet is relatively large compared to an intensity of the time-varying magnetic field generated by the wireless power receiving antenna. Accordingly, there is a demand for the wireless power receiving antenna that can effectively operate while reducing the thickness of the shielding sheet.

Meanwhile, in order to align the wireless power transmitting module and the wireless power receiving module in the Qi standard, the permanent magnet is employed in the wireless power transmitting module. That is, the permanent magnet is provided in the wireless power transmitting module, and a magnetic body is attached at the central portion of the shielding sheet of the wireless power receiving module. Accordingly, when the wireless power receiving module is brought close to the wireless power transmitting module, the permanent magnet and the magnetic body are aligned with each other by the time-invariant magnetic field generated by the permanent magnet. As a result, the wireless power transmitting module and the wireless power receiving module are aligned with each other.

Even in such a method, when the thickness of the shielding sheet is made thin by the influence of the time-invariant magnetic field generated by the permanent magnet as in the PMA method described above, there is a problem that the performance as the shielding sheet deteriorates, or the function as the shielding sheet cannot performed.

As a result of repeated research and experimentation by the present inventors, have found that in constructing the permanent magnet included in the wireless power transmitting module, a size of the permanent magnet is related to a size of the wireless power receiving antenna provided in the wireless power receiving module and has a large influence on the operation of the wireless power receiving antenna. The present invention has been completed based on such awareness.

That is, what the inventors have found through the repeated research and experiment is that when the central portion of the wireless power receiving antenna in which a pattern portion is not formed, has a size which is equal to or larger than the size of the permanent magnet, it is possible to minimize the influence of the permanent magnet and thus the wireless power receiving antenna can work smoothly.

An object of the present invention is to provide a wireless power receiving module that has the wireless power receiving antenna capable of smoothly operating by minimizing the influence of the permanent magnet and that can be made thinner by reducing the overall thickness of the shielding unit.

SUMMARY

According to an aspect of the present invention, there is provided a wireless power receiving module to interact with a wireless power transmitting module including at least one wireless power transmitting antenna and a permanent magnet. The wireless power receiving module includes an antenna unit including a wireless power receiving antenna of which coil pattern portion is formed with a hollow portion at a central portion of a predetermined area, and a shielding unit disposed on one surface of the antenna unit so as to shield a magnetic field. In the wireless power receiving module, a shortest length between inner sides of the coil pattern portion facing each other is the same as or larger than a diameter of the permanent magnet.

According to a preferred embodiment of the present invention, the shortest length between inner sides of the coil pattern portion of the wireless power receiving antenna facing each other may be an equal to or shorter than a shortest length between inner sides of coil pattern portion of the wireless power transmitting antenna facing each other.

Also, the coil pattern portion may be a coil wound a plurality of times in a form of any one of a circle, an ellipse, a polygon, and a combination thereof.

The shortest length may be a length of a straight line passing a center point of the hollow portion.

The wireless power receiving antenna may include a flat conductive coil wound a plurality of times, or a printed conductive pattern on a side of a circuit board.

The wireless power receiving module may include a magnetic body for changing a magnetic flux by inducing a part of magnetic force lines generated by the permanent magnet when the wireless power receiving module approaches the wireless power transmitting module. Here, the magnetic body may be disposed in the hollow portion.

In addition, when the diameter of the permanent magnet is 15.5 mm, a total thickness of the shielding unit may be 0.10 mm to 0.16 mm.

In addition, the antenna unit may be a combo type further including at least one other antenna using a different frequency band from the wireless power receiving antenna.

The at least one other antenna may include at least one of a magnetic secure transmission (MST) antenna and a near field communication (NFC) antenna.

In addition, the shielding unit may include a first shielding sheet and a second shielding sheet both of which have different characteristics in a predetermined frequency band.

The first shielding sheet may be disposed on an area corresponding to the wireless power receiving antenna, and the second shielding sheet may be disposed on an area corresponding to the other antenna.

In addition, the first shielding sheet may have a relatively higher permeability than a permeability of the second shielding sheet in a frequency band of 100 to 300 kHz.

When the first shielding sheet has the same permeability as the second shielding sheet in a frequency band of 100 to 300 kHz, a permeability loss rate of the first shielding sheet may be a relatively smaller value than a permeability loss rate of the second shielding sheet.

In addition, the second shielding sheet may have a relatively higher permeability than a permeability of the first shielding sheet at a frequency of 13.56 MHz.

Also, when the second shielding sheet has the same permeability as the first shielding sheet at a frequency of 13.56 MHz, the permeability loss rate of the second shielding sheet may be a relatively smaller value than the permeability loss rate of the first shielding sheet.

The first shielding sheet may be a ribbon sheet including at least one of an amorphous alloy and a nanocrystalline alloy, and the second shielding sheet may be a ferrite sheet.

In addition, the shielding unit may include any one of a ribbon sheet including at least one of an amorphous alloy and a nanocrystal alloy, a ferrite sheet, and a polymer sheet.

In addition, the shielding unit may include a plurality of ribbon sheets, including at least one of an amorphous alloy and a nanocrystal alloy, stacked in multiple layers.

According to the present invention, as the wireless power receiving antenna can be smoothly operated by minimizing the influence of the permanent magnet, requirements and characteristics for the wireless charging can be stably realized.

In addition, even if the overall thickness of the shielding unit is designed to be 0.16 mm or less, or even 0.13 mm or less, all the design conditions and characteristics required by the wireless power receiving module can be satisfied. Accordingly, the overall thickness of the shielding unit can be less or 0.16 mm, or even less or 0.13 mm, so that the total thickness of the wireless power receiving module can be reduced to 0.3 mm or less. Thus, it can be applied stably and efficiently to a lightweight, thin and compact mobile terminal.

BRIEF DESCRIPTION OF THE DRAWINGS

FIG. 3A is a view showing a case where a coil pattern portion of a wireless power receiving antenna is wound in a circular shape, and FIG. 3B is a view showing a case where the coil pattern portion of the wireless power transmitting antenna is wound in a rectangular shape.

FIG. 5A illustrates a case where the first sheet is stacked on a side of the second sheet, and FIG. 5B illustrates a case where the first sheet is inserted in the second sheet.

FIG. 7A illustrates a case where the coil pattern portion of the antenna is wound in a circular shape, FIG. 7B illustrates a case where the coil pattern portion of the antenna is wound in a rectangular shape, and FIG. 7C illustrates a case where the coil pattern portion of the antenna is wound in a square shape.

DETAILED DESCRIPTION OF THE EMBODIMENTS

The above and other objects, features, and advantages of the present invention can be appreciated by the following description and will be understood more clearly by embodiment of the present invention. In addition, it will be appreciated that the objects and advantages of the present invention will be easily realized by means shown in the appended patent claims, and combinations thereof. Accordingly, the technical spirit of the present invention can be easily implemented by one of ordinary skill in the art. Further, if it is determined that the detailed description of the known art related to the present invention makes the gist of the present invention unnecessarily obscure, a detailed description thereof will be omitted.

Figure 4:
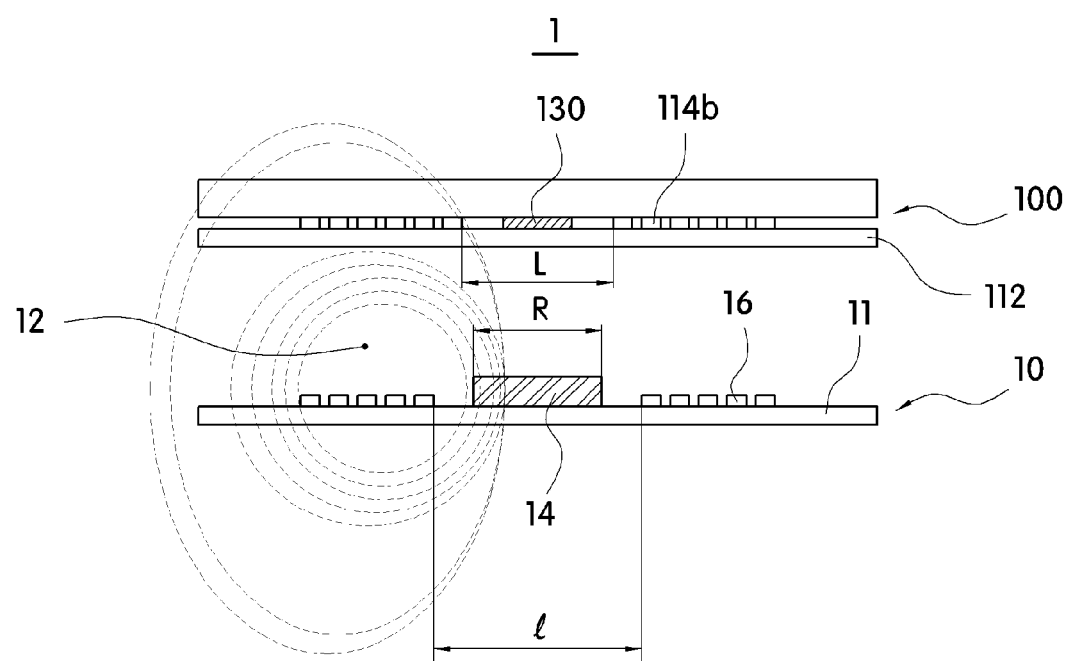
FIG. 4 is a view showing a size relationship among the wireless power receiving antenna, a permanent magnet and the wireless power transmitting antenna in a wireless power charging system to which the wireless power receiving module is applied.
Figure 7A:
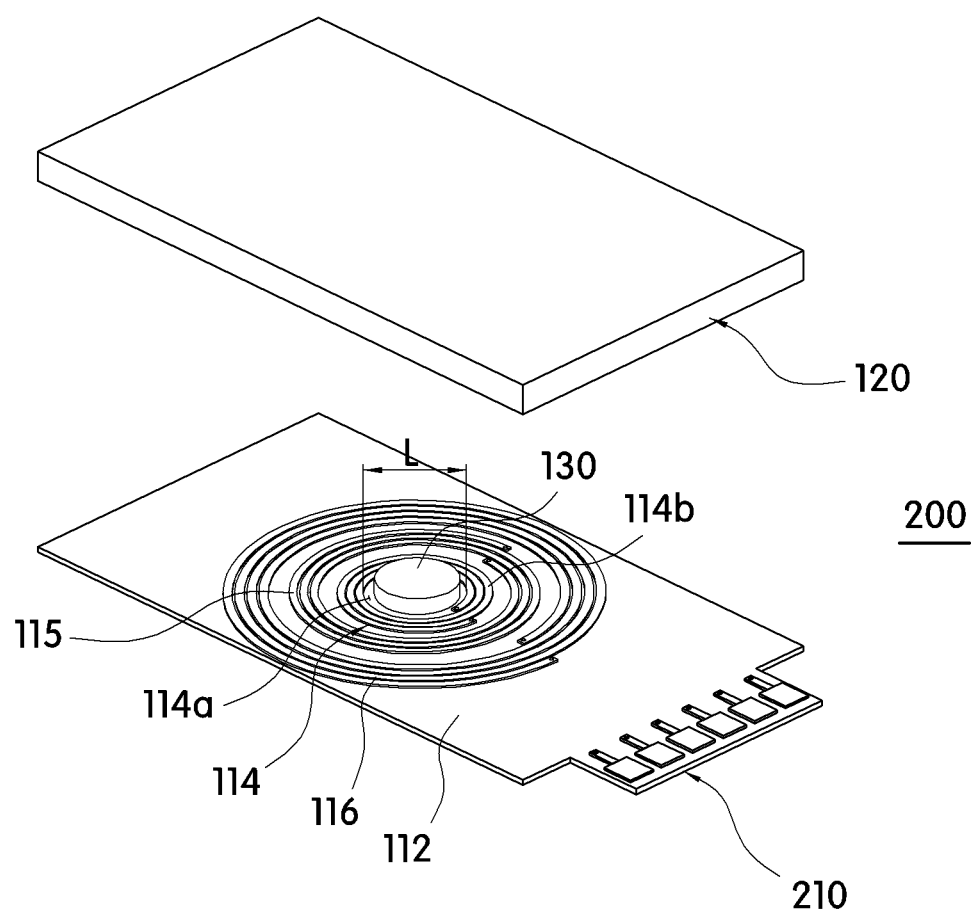
FIG. 7A to FIG. 7C are views showing a case where an antenna unit applied to the wireless power receiving module includes a plurality of antennas, according to an exemplary embodiment of the present invention. Particularly.
Figure 8:
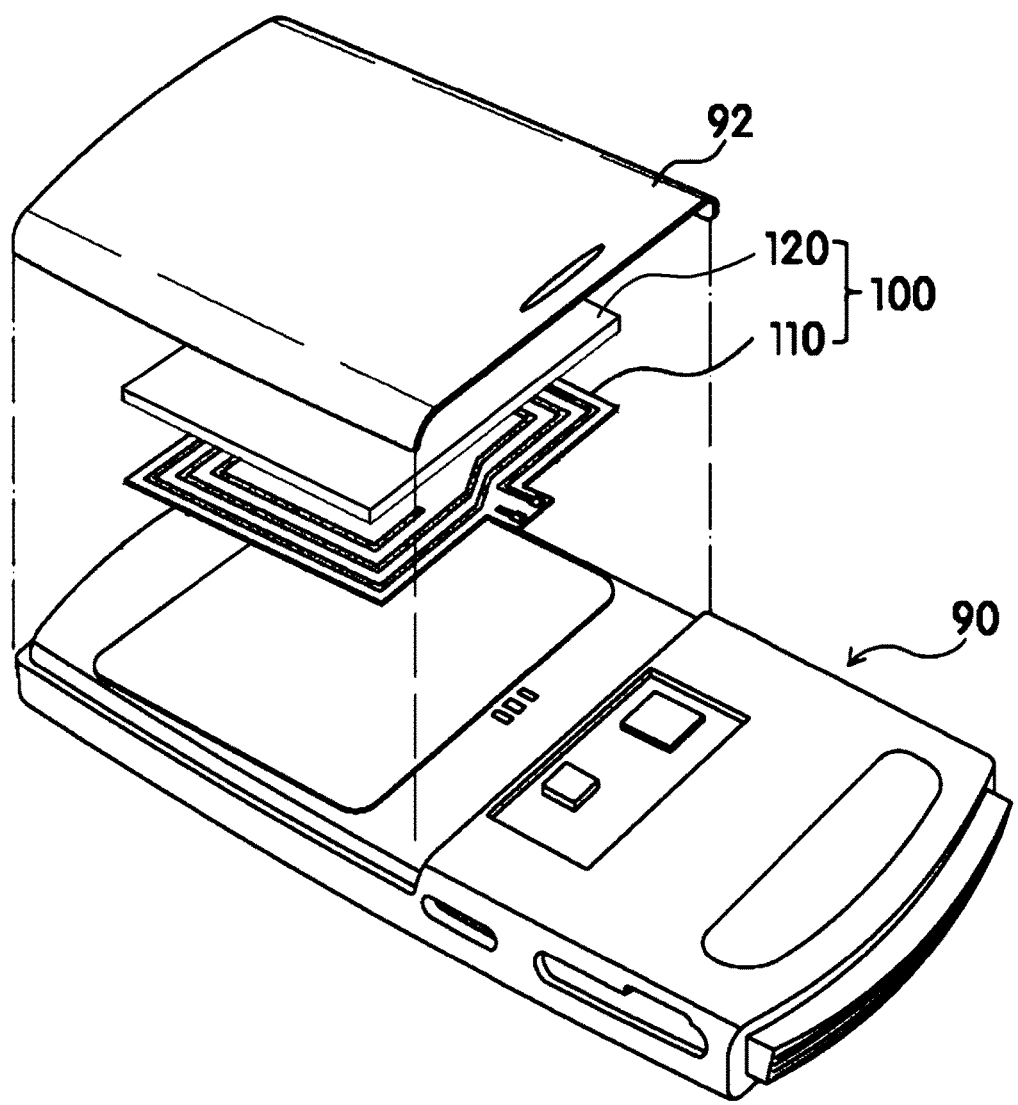
FIG. 8 illustrates a case where the wireless power receiving module according to an exemplary embodiment of the present invention is applied to a mobile phone.

As shown in FIGS. 4 and 7A, a wireless power charging system 1 may include a wireless power transmitting module 10, a wireless power receiving module 100 or 200, and the like. The wireless power receiving module 100 or 200 may be embedded in a portable terminal such as a smart phone and electrically connected to a battery built-in the smart phone (refer to FIG. 8). The wireless power transmitting module 10 may be provided in a separate case or the like, not shown.

Here, the portable terminal may be a portable electronic device such as a mobile phone, a personal digital assistant (PDA), a portable media player (PMP), a tablet computer, a multimedia device, or the like.

The wireless power transmitting modules 10 may operate as the wireless power receiving module 100 or 200 approaches the wireless power transmitting modules 10 and supply a wireless power to the wireless power receiving modules 100 or 200 through a wireless power transmitting antenna 16. The wireless power receiving modules 100 or 200 can charge the battery included in an electronic device such as the portable terminal using the wireless power supplied as described above.

As shown in FIGS. 4 and 7A, the wireless power transmitting module 10 may include a permanent magnet 14 and the wireless power transmitting antenna 16. The wireless power transmitting module 10 may be operated in a manner of the PMA standard, and in that case the wireless transmitting module 10 may further include a Hall sensor 12.

Here, the permanent magnet 14 included in the wireless power transmitting module 10 may be used for the operation of the Hall sensor 12 in the PMA standard, or may be used for an alignment between the wireless transmitting module 10 and the wireless power receiving module 100 or 200.

The wireless power receiving module 100 or 200 according to an exemplary embodiment of the present invention may be applied to the wireless power charging system 1 described above, and may further include an antenna unit 110 or 210 and a shielding unit 120.

The antenna unit 110 or 210 may include one or more antennas using a predetermined frequency band, and may be to perform a predetermined function using the frequency band.

The antenna unit 110 or 210 may include a plurality of antennas to perform different roles, and may be fixed to a surface of the shielding unit 120 through an adhesive layer.

Here, a radiator of the antenna may be formed of a flat coil wound in a clockwise direction or counterclockwise direction. The wound flat coil may have a circular shape, an elliptical shape, a spiral shape, or a polygonal shape such as a quadrangular shape. A surface of the radiator may be fixed to the shielding unit 120. The antenna may be a loop-shaped coil pattern which can be made by patterning a conductor such as a copper foil on at least one surface of a circuit board 112 made of synthetic resin such as polyimide (PI), polyethylene terephthalate (PET), or the like, or by using conductive ink. In addition, in constructing the antenna unit 110 or 210 to include a plurality of antennas, the plurality of antennas may be configured in a form of combination of the flat coil and the antenna pattern patterned on the circuit board.

The antenna unit 110 or 210 according to exemplary embodiments of the present invention may include a combination of a part receiving the wireless power signal transmitted from the wireless power transmitting module 10, performing a role of a receiving coil (Rx coil) for producing a power required by a portable electronic device, and the other part described below.

Figure 3A:
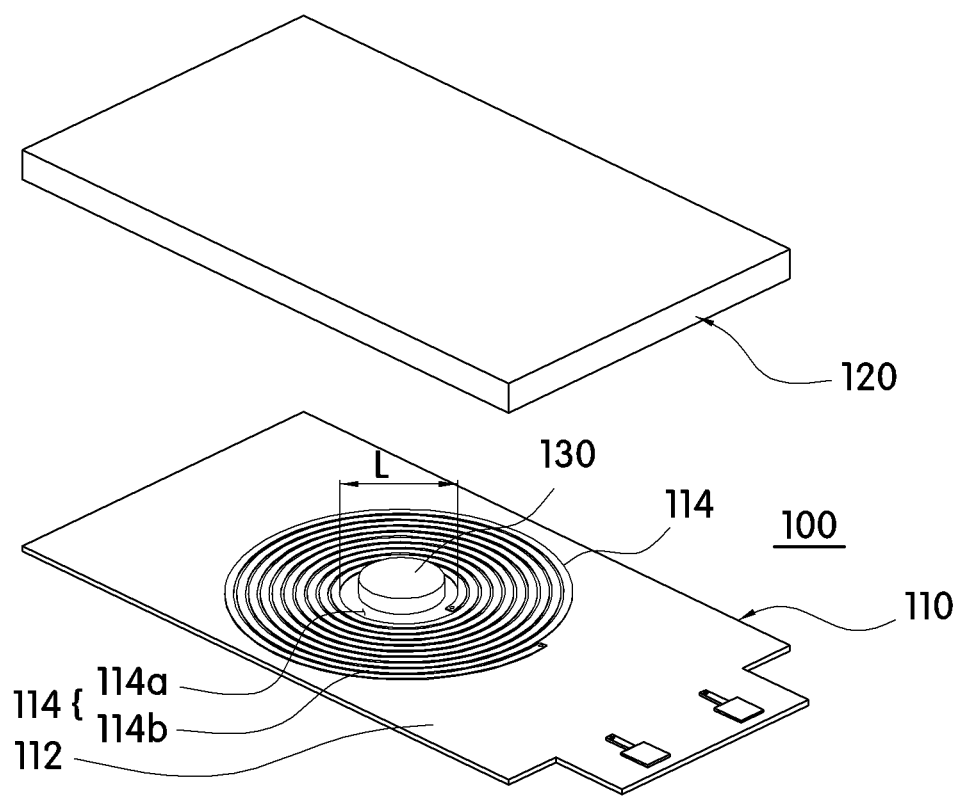
FIGS. 3A and 3B are schematic views showing the wireless power receiving module according to an exemplary embodiment of the present invention.
Figure 3B:
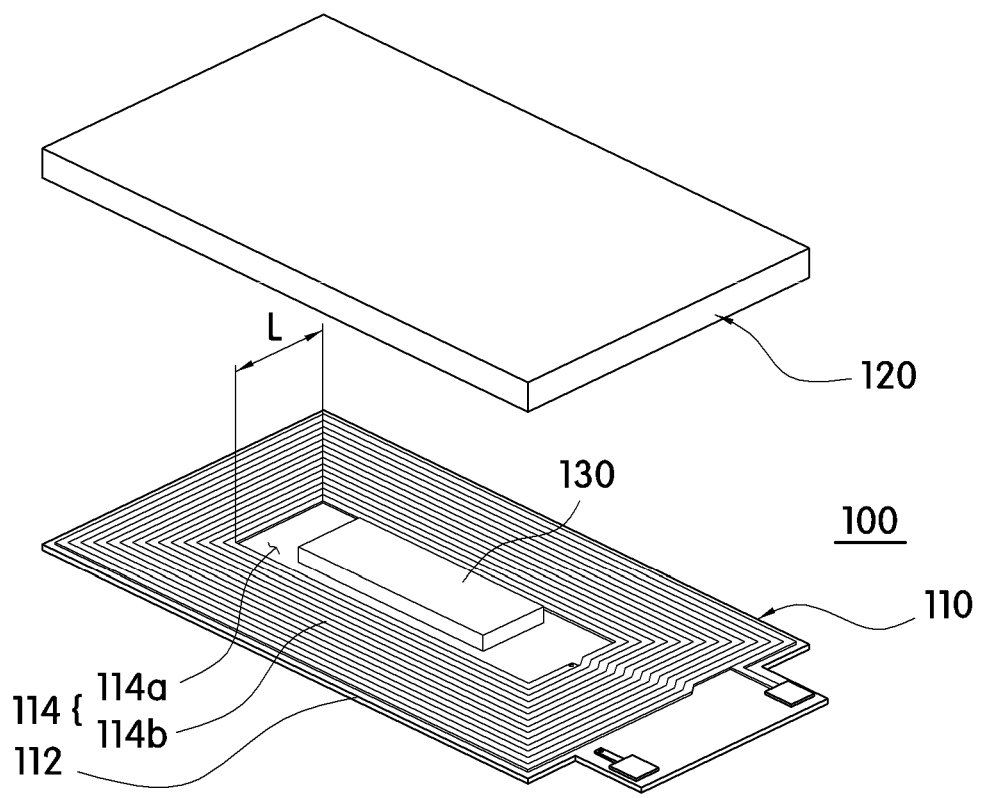
Figure 7B:
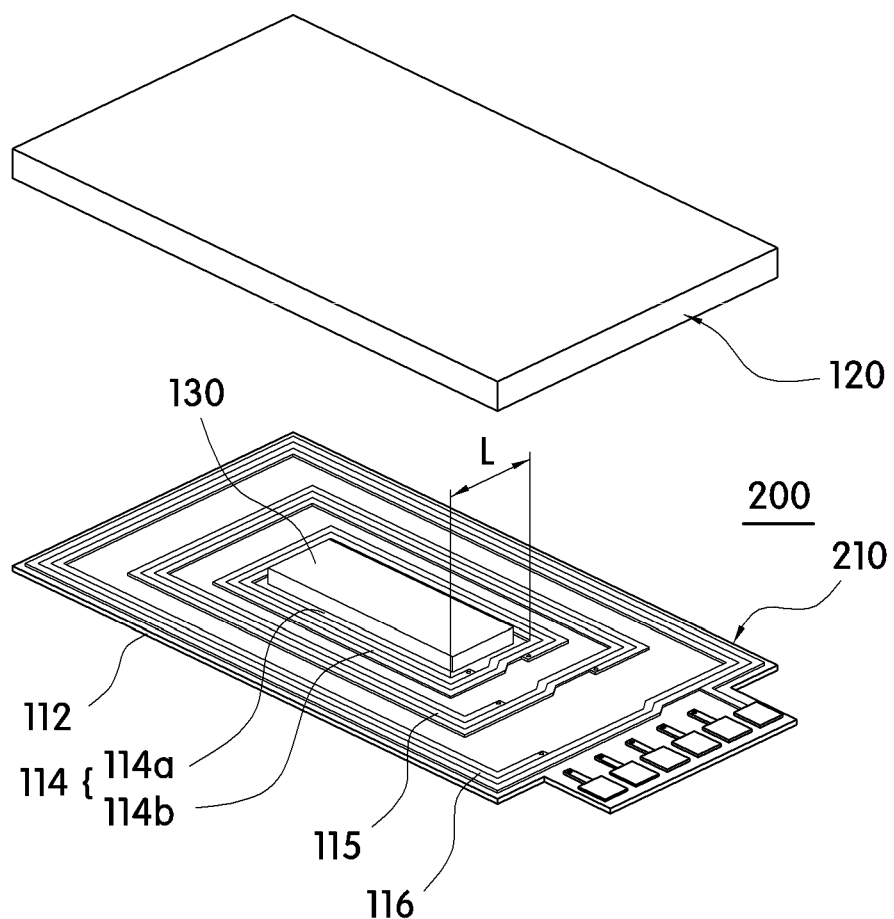
Figure 7C:
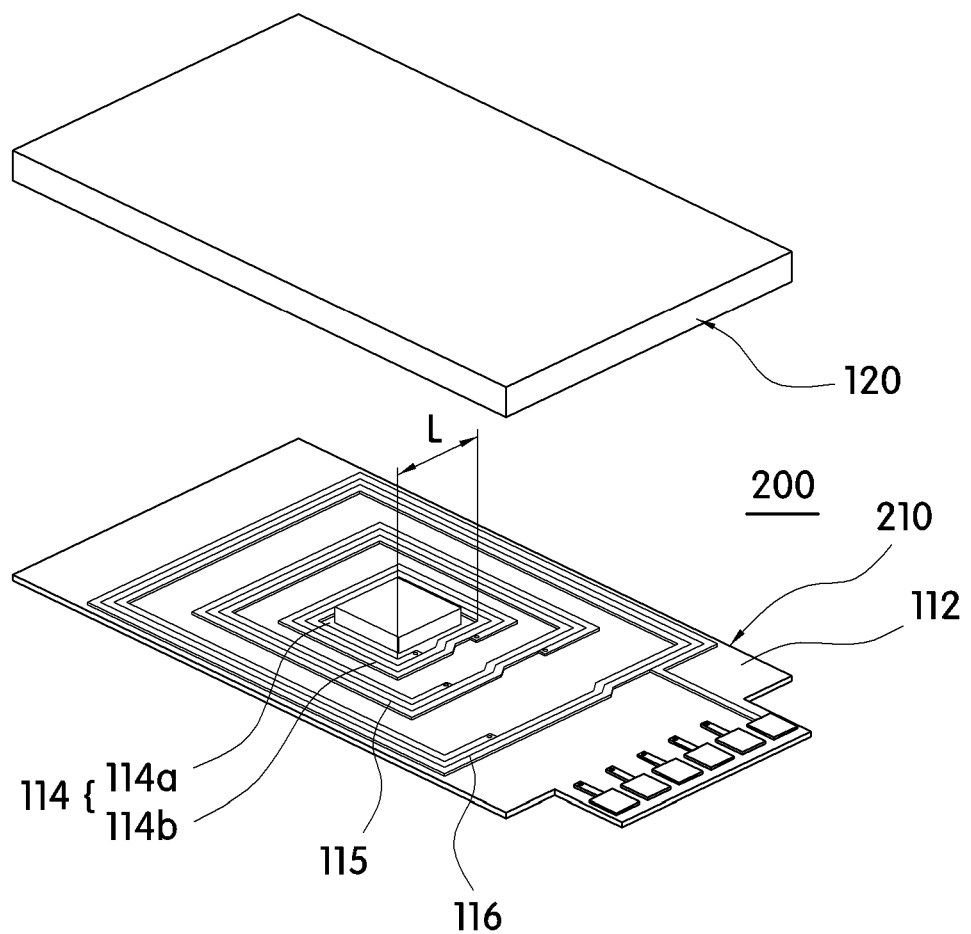

The antenna unit 110 or 210 may include at least one wireless power receiving antenna 114 for receiving wireless power (refer to FIGS. 3A and 3B), and may further include at least one other antennas 115 and 116 using a different frequency band from the wireless power receiving antenna 114 (refer to FIGS. 7A to 7C).

In an exemplary example, the other antennas 115 and 116 may be an MST antenna 115 or an NFC antenna 116, and the antenna unit 210 may further include at least one of the MST antenna 115, and the NFC antenna 116.

Here, the NFC antenna 116 may be provided to have a fine line width because the frequency band used by the NFC antenna 116 is higher than that of the wireless power receiving antenna 114. The wireless power receiving antenna 114 may be provided to have a wider line width than that of the NFC antenna 116 because the wireless power receiving antenna 114 is used for power transmitting and uses a frequency band that is lower than that of the NFC antenna 116. In addition, the MST antenna 115 and the wireless power receiving antenna 114 may be disposed inside the NFC antenna 116.

However, the positions of the NFC antenna 116, the MST antenna 115 and the wireless power receiving antenna 114 may not be limited thereto. Their arrangement may be appropriately changed according to design conditions.

Meanwhile, the wireless power receiving antenna 114 applied to the present invention may include a hollow portion 114a having a predetermined area at a center of a coil pattern portion 114b. That is, the coil pattern portion 114b may be formed by winding a conductor a plurality of times in a loop shape so as to surround the hollow portion 114a, and the coil pattern portion 114b may perform a role of the Rx coil for receiving the wireless power signal transmitted from the wireless power transmitting module 10.

Here, the coil pattern portion 114b may be formed in a circular shape, an elliptical shape, a polygonal shape including a square and a rectangle, or a combination thereof.

The area of the hollow portion 114a of the wireless power receiving antenna 114 may be equal to or slightly smaller than the central area of the wireless power transmitting antenna provided in the wireless power transmitting module 10, and may be equal to or relatively larger than the area of the permanent magnet 14 disposed at the center of the wireless power transmitting antenna 16.

Figure 1:
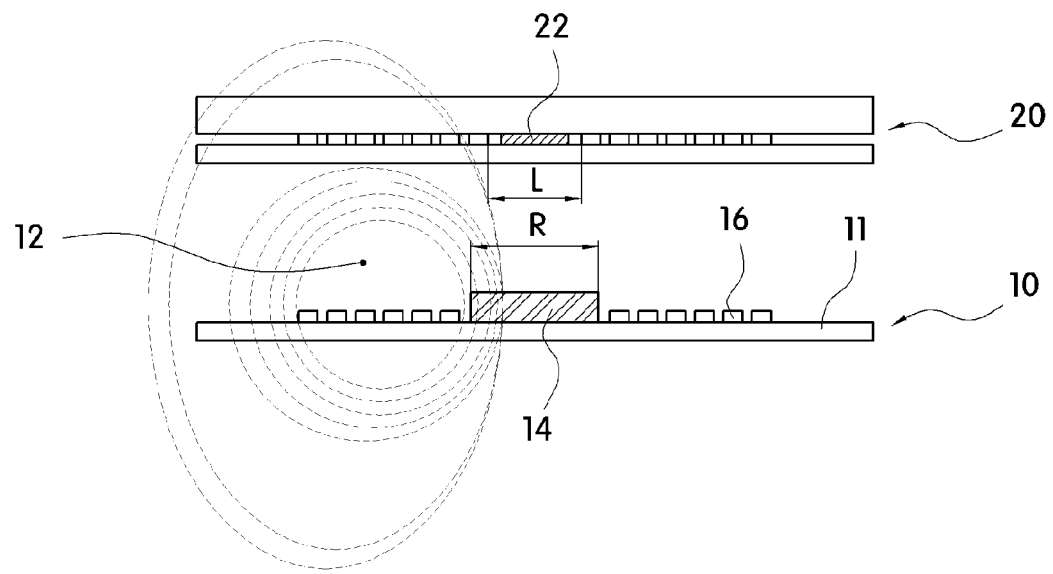
FIG. 1 is a view to describe a concept of detecting approach of a wireless power receiving module to a wireless power transmitting module having a permanent magnet.
Figure 2:
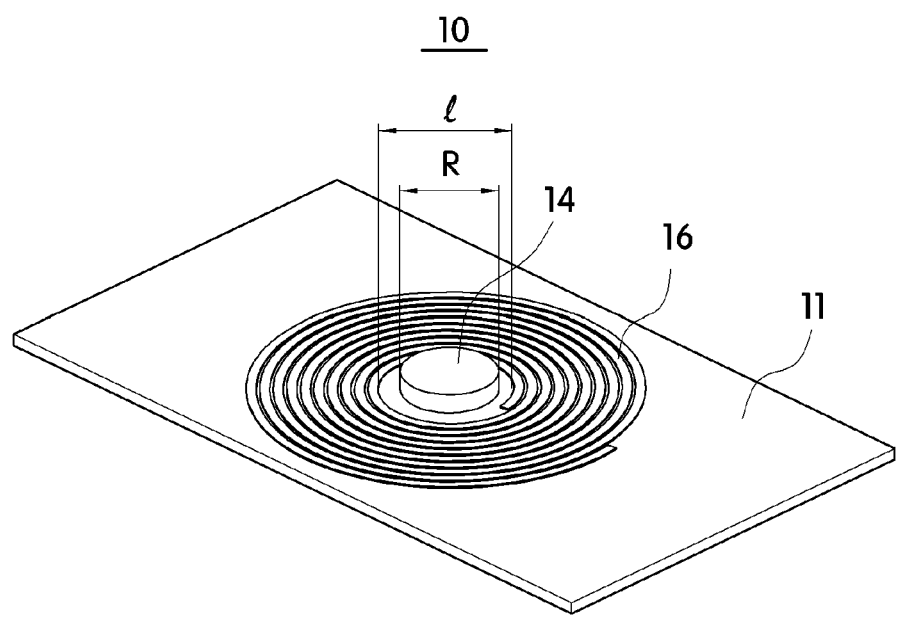
FIG. 2 is a schematic view of the wireless power transmitting module shown in FIG. 1.

In an exemplary example, in constructing of the pattern portion 114b, the shortest length L between inner sides of the coil pattern portion 114b facing each other is equal to or longer than the diameter R of the permanent magnet 14 provided in the wireless power transmitting module 10. In addition, in constructing of the pattern portion 114b, the shortest length L between inner sides of the coil pattern portion 114b facing each other is equal to or a shorter than the shortest length (l) between inner sides of the coil pattern portion of the wireless power transmitting antenna 16, included in the wireless power transmitting module 10, facing each other among the pattern portions (refer to FIG. 2).

The shortest length L between the inner sides of the coil pattern portion 114b may be an inner diameter of the hollow portion 114a when the coil pattern portion 114b is a circular shape. When the coil pattern portion 114b is a rectangular shape, the shortest length L between the inner sides of the coil pattern portion 114b may be a length of a relatively shorter side out of the two different-length sides of the hollow portion 114a. In addition, the shortest length L between the inner sides of the coil pattern portion 114b may be a straight line passing the center point of the hollow portion 114a.

Accordingly, in a case where the permanent magnet 14 is disposed at the center of the wireless power transmitting antenna 16, the wireless power receiving antenna 114 may be configured that an area of the hollow portion 114a formed inside the pattern portion 114b may be the same as or relatively larger than an area of the permanent magnet 14 provided in the wireless power transmitting module 10, and may be the same as or relatively smaller than a central coil-free area of the wireless power transmitting antenna 16 provided to the wireless power transmitting module 10.

Accordingly, when the wireless power transmitting module 10 and the wireless power receiving module 100 or 200 according to an exemplary embodiment of the present invention approach each other and the center point of the permanent magnet 14 and the center point of the hollow portion 114a are aligned with each other, the permanent magnet 14 can always be disposed inside of the hollow portion 114a. Reference will now be made in detail to the embodiments of the present general inventive concepts, examples of which are illustrated in the accompanying drawings, wherein like reference numerals refer to the like elements throughout. The embodiments are described.

That is, if the wireless power transmitting module 10 and the wireless power receiving module 100 or 200 are aligned with each other, the permanent magnet 14 provided in the wireless power transmitting module 10 is always disposed inside the hollow portion 114a of the wireless power receiving antenna 114. Thus, the coil pattern portion 114b of the wireless power receiving antenna 114 may not be disposed on right above or below the area of the permanent magnet 14.

Accordingly, the influence of the time-invariant magnetic field generated from the permanent magnet 14 on the magnetic field generated from the coil pattern portion 114b upon wireless charging can be minimized, so that the wireless power receiving antenna 100 or 200 provided in the wireless power receiving module 100 can be smoothly operated. Therefore, even if the total thickness of the shielding unit 120 is 0.16 mm or less, or even about 0.13 mm, the characteristics required for wireless charging can be satisfied.

In result, as the total thickness of the wireless power receiving module 100 or 200 can be reduced to 0.3 mm or less, the requirement for thinning can be satisfied.

In an exemplary example, when the permanent magnet 14 is disposed at the center of the wireless power transmitting antenna 16 and the diameter R of the permanent magnet is about 15.5 mm, the shortest length L between the inner sides of the coil pattern portion 114b may be about 15.7 mm. In that case, even though the thickness of the shielding unit 120 may be 0.16 mm or less, and even 0.13 mm, the wireless power receiving antenna 114 can be smoothly operated. Thus, the wireless power receiving modules 100 and 200 having a total thickness of 0.3 mm can be realized.

However, it should be understood that the overall thickness of the wireless power receiving modules 100 and 200 according to the present invention is not limited thereto, but may have various thicknesses depending on design conditions and may have very thin thickness.

On the other hand, a magnetic body 130 may be disposed on the hollow portion 114a of the wireless power receiving antenna 114.

In an exemplary example, the magnetic body 130 may be an attractor for inducing change in an output voltage of the Hall sensor 12. The attractor may satisfy operation-start conditions of the wireless power transmitting module 10 by changing a path of the magnetic flux through inducing a part of the magnetic force lines generated by the wireless power transmitting module 10 when the wireless power receiving module 100 or 200 relatively approaches the wireless power transmitting module 10.

The magnetic body 130 may be a magnetic piece of thin plate, and may have the same size as the size of the hollow portion 114a so as to obtain a high efficiency by securing a maximum area from the allowed size of the wireless power receiving module 100 or 200.

The magnetic body 130 may be integrated with the shielding unit 120 by being attached to a surface of the shielding unit 120. The magnetic body 130 may be integrated with the antenna unit 110 or 210 by being attached to a surface of the antenna unit 110 or 210.

In addition, the magnetic body 130 may be formed of a ribbon sheet of thin plate including at least one of an amorphous alloy and a nanocrystalline alloy. In addition, the magnetic body 130 may be formed of a single-layer ribbon sheet, or may be formed by stacking a plurality of ribbon sheets in three or more layers.

Here, the amorphous alloy or the nanocrystalline alloy may include a three-element alloy or a five-element alloy. In an exemplary example, the three-element alloy may include Fe, Si, and B, and the five-element alloy may include Fe, Si, B, Cu, and Nb.

In addition, the magnetic body 130 may be constructed in a divided form into a plurality of fine pieces so as to suppress generation of eddy currents, where the plurality of fine pieces may be totally or partially insulated from each other. In addition, each piece may be irregularly randomized.

When the wireless power receiving module 100 or 200 is brought close to the wireless power transmitting module 10, the magnetic body 130 may be provided as an alignment means for aligning the wireless power receiving module 100 or 200 and the wireless power transmitting module 10 through interaction with the permanent magnet 14 provided in the wireless power transmitting module 10. The magnetic body 130 may be formed of a permanent magnet.

The shielding unit 120 may be formed of a plate-shaped member having a predetermined area, and the antenna unit 110 or 210 may be fixed on a surface of the shielding unit 120. The shielding unit 120 may enhance the performance of the antennas 114, 115, and 116 operating in predetermined frequency bands by shielding the magnetic field generated by the antenna unit 110 or 210 to obtain an increased magnetic flux density.

For this, the shielding unit 120 may be made of a magnetic material so as to shield the magnetic field generated by the antenna unit 110 or 210.

In an exemplary example, the shielding unit 120 may be a ferrite sheet, a polymer sheet, or a ribbon sheet including at least one of an amorphous alloy, and a nanocrystalline alloy. However, it should be noted that the shielding unit 120 is not limited to the above-mentioned kind, and any material having magnetic properties may be used.

In an exemplary example, the ferrite sheet may be a sintered ferrite sheet, and may include at least one of Mn—Zn ferrite and Ni—Zn ferrite. Here, the amorphous alloy or the nanocrystalline alloy may include a three-element alloy or a five-element alloy. The three-element alloy may include Fe, Si, and B, and the five-element alloy may include Fe, Si, B, Cu, and Nb.

Figure 6:
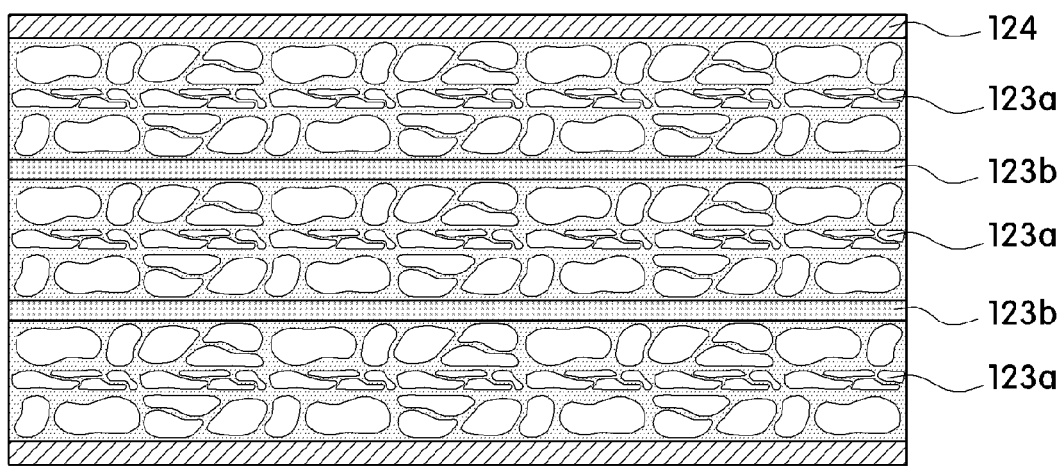
FIG. 6 is a detailed sectional view showing a case where the shielding unit applied to the wireless power receiving module is formed by stacking a plurality of ribbon sheets in multiple layers, according to an exemplary embodiment of the present invention.

As shown in FIG. 6, the shielding unit 120″ may be provided by stacking the ribbon sheets 123a, which include at least one of the plurality of amorphous alloys and nanocrystalline alloy, through the adhesive layer 123b.

In addition, the shielding unit 120 may be constructed in a divided form into a plurality of fine pieces so as to suppress generation of eddy currents, and the plurality of fine pieces may be totally or partially insulated from each other. Each piece may be irregularly randomized.

When the shielding unit 120″ is constructed by stacking the plurality of shielding sheets 123a divided into fine pieces, the adhesive layer 123b disposed between the respective shielding sheets may include a non-conductive component to insulate the fine pieces from each other by infiltrating between fine pieces composing a pair of stacked-sheets. Here, the adhesive layer 123b may be provided as an adhesive agent. Alternatively, the adhesive layer 123b may be provided in a form that the adhesive agent is applied on one or both surfaces of a substrate in form of a film.

In addition, the shielding unit 120, 120', or 120″ may be provided with a separate protective film 124 on at least one of its upper surface and the lower surface.

Meanwhile, the shielding unit 120' may include a plurality of shielding sheets having different characteristics to enhance the performance of the antennas operating in different frequency bands. Particularly, when the antenna unit 210 includes the wireless power receiving antenna 114 and the NFC antenna 116, the antenna unit 210 may include the first shielding sheet 121 and the second shielding sheet 122 having different characteristics to enhance performance of the antennas using different frequency bands.

In an exemplary example, the first shielding sheet 121 may be disposed on an area corresponding to the wireless power receiving antenna 114 to enhance the performance of the wireless power receiving antenna 114. The second shielding sheet 122 may be disposed on an area corresponding to the NFC antenna 116 to enhance the performance of the NFC antenna 116.

Here, the first shielding sheet 121 may have an area which can fully cover the wireless power receiving antenna 114, and the second shielding sheet 122 may have an area which can fully cover the NFC antenna 116. In addition, when the MST antenna 115 is disposed outside the wireless power receiving antenna 114, the first shielding sheet 121 may include, or not include right above area of the MST antenna 115.

Figure 5A:
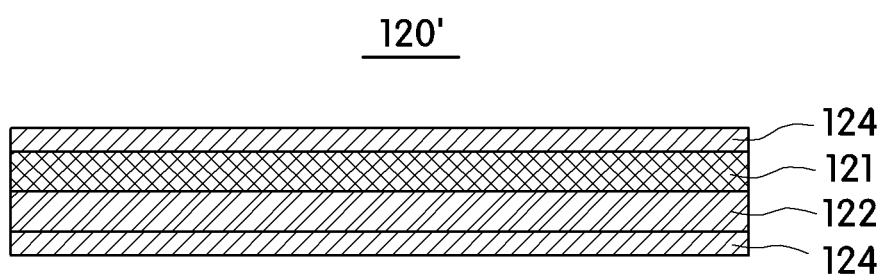
FIGS. 5A and 5B are views showing a case where a shielding unit applied to the wireless power receiving module includes a first sheet and a second sheet, according to an exemplary embodiment of the present invention. Particularly.
Figure 5B:
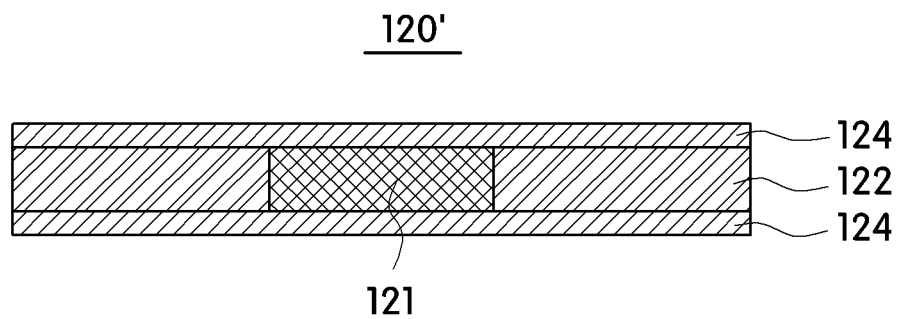

In this case, the shielding unit 120' may be provided in a form that the first shielding sheet 121 is stacked on a side of the second shielding sheet 122 (refer to FIG. 5A), or may be provided in a frame type that the first shielding sheet 121 is inserted into and surrounded by the second shielding sheet 122 (refer to FIG. 5B).

In addition, when the shielding unit 120' is formed of a plurality of shielding sheets having different characteristics, the first shielding sheet 121 and the second shielding sheet 122 may have different characteristics.

In other words, the first shielding sheet 121 and the second shielding sheet 122 may have different permeabilities in a predetermined frequency band, or may have different saturating magnetic fields. If the first shielding sheet 121 and the second shielding sheet 122 have the same permeability, these two shielding sheets 121 and 122 may have different values of permeability loss rate.

More specifically, the first shielding sheet 121 may have a relatively higher permeability in a low frequency band of 100 to 300 kHz than that of the second shielding sheet 122, and may have a relatively higher saturating magnetic field in the frequency band of 100 to 300 kHz than that of the second shielding sheet. In a case that the first shielding sheet 121 and the second shielding sheet 122 have the same permeability in the frequency band of 100 to 300 kHz, the permeability loss rate of the first sheet 121 may have a relatively lower value than that of the second shielding sheet 122.

In an exemplary example, the ribbon sheet 123a including at least one of an amorphous alloy and a nanocrystalline alloy having a permeability ranged 600 to 700 in the frequency band of 100 to 300 kHz may be used as the first shielding sheet 121. The ferrite sheet having a permeability of 600 or less in the frequency band of 100 to 300 kHz may be used as the second sheet 122.

Accordingly, since the first shielding sheet 121 has a relatively higher magnetic permeability than that of the second shielding sheet 122 in the low frequency band of 100 to 300 kHz, a time-varying magnetic field generated through the wireless power transmission in the frequency band of 100 to 300 kHz by a power transmission device during wireless charging can be attracted by the first shielding sheet 121 having a relatively high permeability. Thus, the wireless power transmission antenna 116 disposed on the first shielding sheet 121 can receive the wireless power signal with high efficiency.

Meanwhile, the first shielding sheet 121 may be required to shield a time-invariant magnetic field by the permanent magnet 14 provided in wireless power transmitting module. However, since the time-invariant magnetic field has a greater influence on the shielding unit 120 or 120' than the time-varying magnetic field, the time-invariant magnetic field may cause the shielding unit to be magnetically saturated, thereby drastically lowering the performance of the shielding sheet, or the power transmission efficiency.

Therefore, it is necessary to prevent magnetic saturation by the permanent magnet 14 of the wireless power transmitting module 10. Since the ribbon sheet including at least one of the amorphous alloy and the nanocrystal alloy has a relatively larger saturation magnetic field than the ferrite sheet in the frequency band of 100 to 300 kHz, the first shielding sheet 121 located on the wireless power receiving antenna 114 can prevent magnetization by the permanent magnet in the wireless charging frequency band of 100 to 300 kHz, and thus smooth charging can be achieved.

In addition, when the permeability loss rate of the first shielding sheet 121 is lower than that of the second shielding sheet 122 even if the first shielding sheet 121 and the second shielding sheet 122 have the same permeability in the frequency band of 100 to 300 kHz, as a result the permeability loss according to the permeability loss rate is reduced when the wireless charging is performed. Accordingly, the time-varying magnetic field generated through the power transmission in the frequency band of 100 to 300 kHz by the wireless power transmission module is induced toward the first shielding sheet 121 having a relatively higher permeability. Thus, the wireless power receiving antenna 114 disposed on the first shielding sheet 121 can receive the wireless power signal with high efficiency.

Meanwhile, the second shielding sheet 122 may have a relatively higher magnetic permeability at a high frequency of 13.56 MHz than that of the first shielding sheet. In a case that the first shielding sheet 121 and the second shielding sheet 122 have the same permeability at the frequency of 13.56 MHz, the permeability loss rate of the second shielding sheet 122 may be relatively smaller than the permeability loss rate of the first shielding sheet 121.

In an exemplary example, the ribbon sheet 123a including at least one of an amorphous alloy and a nanocrystalline alloy may be used as the first shielding sheet 121, and the ferrite sheet may be used as the second shielding sheet 122. Here, the first sheet 121 may have a lower permeability than that of the second shielding sheet 122 at the frequency of 13.56 MHz.

Accordingly, the second shielding sheet 122 has a relatively higher magnetic permeability than that of the first shielding sheet 121 at the frequency of 13.56 MHz, when the wireless charging is performed. Thus, in case that NFC is performed, a time-varying magnetic field generated by the high frequency signal of 13.56 MHz generated from an antenna equipped in a radio frequency (RF) reader device is induced toward the second shielding sheet 122 having a relatively high permeability. Thereby, the NFC antenna 116 disposed on the second shielding sheet 122 can receive the high frequency signal with high efficiency.

In addition, when the permeability loss rate of the second shielding sheet 122 is lower than that of the first shielding sheet 122, even if the first shielding sheet 121 and the second shielding sheet 122 have the same permeability in the frequency of 13.56 kHz, as a result the loss of permeability according to the permeability loss rate is reduced when NFC is performed. Accordingly, the time-varying magnetic field generated by a high frequency signal of 13.56 MHz generated from the antenna equipped in RF reader apparatus is induced toward the second shielding sheet 122 having a relatively high permeability, so that the NFC antenna 114 disposed on the second shielding sheet 122 can receive the high frequency signal with high efficiency.

Here, it has been described above that the ribbon sheet including at least one of an amorphous alloy and a nanocrystal alloy may be used as the first shielding sheet 121, and the ferrite sheet is used as the second shielding sheet 122. However, the present invention is not limited thereto. The material of the first shielding sheet 121 and the second shielding sheet 122 may be variously changed, as long as the permeability, the saturation magnetic field, and the permeability loss rate of the first and second shielding sheets 121 and 122 satisfy the conditions relative to each other in the corresponding frequency band.

In an exemplary embodiment, the first shielding sheet 121 and the second shielding sheet 122 may be made of the same material having different magnetic permeabilities at the frequency band of 100 to 300 kHz and/or at the frequency of 13.56 MHz. The ferrite sheet may be used as the first shielding sheet 121, and the ribbon sheet including at least one of the amorphous alloy and the nanocrystal alloy may be used as the second shielding sheet 122. This is because even if they are made of the same material, they can be manufactured to have different characteristics (e.g., in permeability, saturation magnetic field, permeability loss rate, etc.) through change of several conditions such as a heat treatment temperature, number of stacking layers, etc.

It is should be noted that the wireless power receiving modules 100 and 200 according to the exemplary embodiment of the present invention can be applied to the wireless charging based on the Qi standard or the PMA standard. In addition, as for the antenna units 110 and 210, the wireless power receiving antenna 114 using a magnetic induction manner and an Alliance for Wireless Power (A4WP) standard-type antenna using the magnetic resonance may be included by a separate other antenna. The wireless power receiving module 100 or 200 may be attached to a back cover or a rear case 92 of a mobile electronic device 90 such as a portable terminal.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A wireless power receiving module to interact with a wireless power transmitting module including at least one wireless power transmitting antenna and a permanent magnet, comprising:
    an antenna unit including a wireless power receiving antenna of which coil pattern portion is formed with a hollow portion having at a central portion of a predetermined area; and
    a shielding unit disposed on one surface of the antenna unit so as to shield a magnetic field,
    wherein in the wireless power receiving module, a shortest length between inner sides of the coil pattern portion facing each other is the same as or larger than a diameter of the permanent magnet,
    wherein the antenna unit is a combo type further including at least one other antenna using a different frequency band from the wireless power receiving antenna,
    wherein at least one other antenna includes at least one of a magnetic secure transmission (MST) antenna and a near field communication (NFC) antenna.

2. The wireless power receiving module of claim 1, wherein the shortest length between inner sides of the coil pattern portion of the wireless power receiving antenna facing each other is an equal to or shorter than a shortest length between the inner sides of coil pattern portion of the wireless power transmitting antenna facing each other.

3. The wireless power receiving module of claim 1, wherein the shortest length is a straight line passing a center point of the hollow portion.

4. The wireless power receiving module of claim 1, wherein the wireless power receiving antenna includes a flat conductive coil wound a plurality of times, or a printed conductive pattern on a side of a circular board.

5. The wireless power receiving module of claim 1, wherein the wireless power receiving module includes a magnetic body for changing a magnetic flux by inducing a part of magnetic force lines generated by the permanent magnet when the wireless power receiving module approaches the wireless power transmitting module.

6. The wireless power receiving module of claim 1, wherein when the diameter of the permanent magnet is 15.5 mm, a total thickness of the shielding unit is 0.10 mm to 0.16 mm.

7. The wireless power receiving module of claim 1, wherein the shielding unit includes a first shielding sheet and a second shielding sheet both of which have different characteristics in a predetermined frequency band.

8. The wireless power receiving module of claim 7, wherein the first shielding sheet is disposed on an area corresponding to the wireless power receiving antenna, and the second shielding sheet is disposed on an area corresponding to the other antenna.

9. The wireless power receiving module of claim 7, wherein the first shielding sheet has a relatively higher permeability than a permeability of the second shielding sheet in a frequency band of 100 to 300 kHz.

10. The wireless power receiving module of claim 7, wherein when the first shielding sheet has the same permeability as the second shielding sheet in a frequency band of 100 to 300 kHz, a permeability loss rate of the first shielding sheet is a relatively smaller value than a permeability loss rate of the second shielding sheet.

11. The wireless power receiving module of claim 7, wherein the second shielding sheet has a relatively higher permeability than a permeability of the first shielding sheet at a frequency of 13.56 MHz.

12. The wireless power receiving module of claim 7, wherein when the second shielding sheet has the same permeability as the first shielding sheet at a frequency of 13.56 MHz, the permeability loss rate of the second shielding sheet is a relatively smaller value than the permeability loss rate of the first shielding sheet.

13. The wireless power receiving module of claim 7, wherein the first shielding sheet is a ribbon sheet including at least one of an amorphous alloy and a nanocrystalline alloy, and the second shielding sheet is a ferrite sheet.

14. The wireless power receiving module of claim 1, wherein the shielding unit includes any one of a ribbon sheet including at least one of an amorphous alloy and a nanocrystal alloy, a ferrite sheet, and a polymer sheet.

15. The wireless power receiving module of claim 1, wherein the shielding unit includes a plurality of ribbon sheets, including at least one of an amorphous alloy and a nanocrystal alloy, stacked in multiple layers.

* * * * *